(12) United States Patent
Arkko

(10) Patent No.: US 9,356,952 B2
(45) Date of Patent: May 31, 2016

(54) PACKET REDIRECTION IN A COMMUNICATION NETWORK

(75) Inventor: Jari Arkko, Kauniainen (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1419 days.

(21) Appl. No.: 12/161,710

(22) PCT Filed: Jan. 31, 2007

(86) PCT No.: PCT/EP2007/050931
§ 371 (c)(1),
(2), (4) Date: Jan. 10, 2011

(87) PCT Pub. No.: WO2007/088174
PCT Pub. Date: Aug. 9, 2007

(65) Prior Publication Data
US 2011/0090906 A1  Apr. 21, 2011

(30) Foreign Application Priority Data
Jan. 31, 2006  (GB) .................................. 0601913.7

(51) Int. Cl.
*H04L 29/06* (2006.01)
*H04L 29/12* (2006.01)

(52) U.S. Cl.
CPC ...... *H04L 63/1466* (2013.01); *H04L 29/12801* (2013.01); *H04L 29/12952* (2013.01); *H04L 61/6004* (2013.01); *H04L 61/6077* (2013.01); *H04L 69/16* (2013.01); *H04L 69/167* (2013.01)

(58) Field of Classification Search
CPC ....... G06F 21/10; G06F 21/31; G06F 21/575; H04L 2209/80; H04L 9/3236

USPC .................. 370/328, 331, 338, 392, 395.32; 709/238

See application file for complete search history.

(56) References Cited

U.S. PATENT DOCUMENTS

| | | | |
|---|---|---|---|
| 8,630,420 B2* | 1/2014 | Galante ................ | H04L 63/068 380/247 |
| 2003/0084293 A1* | 5/2003 | Arkko et al. .................. | 713/168 |
| 2003/0193965 A1* | 10/2003 | Higuchi et al. ............... | 370/466 |
| 2004/0008845 A1* | 1/2004 | Le et al. ........................ | 380/277 |
| 2004/0165602 A1* | 8/2004 | Park et al. ..................... | 370/401 |
| 2004/0230696 A1* | 11/2004 | Barach et al. ................. | 709/238 |
| 2004/0264465 A1* | 12/2004 | Dunk ............................. | 370/392 |
| 2005/0071627 A1* | 3/2005 | Montenegro et al. ......... | 713/151 |
| 2006/0062248 A1* | 3/2006 | Huang et al. .................. | 370/466 |
| 2006/0077908 A1* | 4/2006 | Park et al. ..................... | 370/254 |
| 2006/0248202 A1* | 11/2006 | Blanchet et al. .............. | 709/227 |

(Continued)

FOREIGN PATENT DOCUMENTS

GB  2 367 986 A  4/2002

OTHER PUBLICATIONS

Bagnulo, M. Hash Based Addresses (HBA). Draft-ietf-shim6-hba-01. Network Working Group, Internet-Draft. Oct. 23, 2005.

(Continued)

*Primary Examiner* — Jung Park

(57) ABSTRACT

A method of controlling the re-direction of IP packets to an IP host having two or more different IP addresses comprises generating a first of said IP addresses as a one-way function of the second IP address. The method further comprises accepting a request to re-direct a packet destined to said first IP address to another IP address only if the other IP address is the second IP address.

12 Claims, 1 Drawing Sheet

(56) References Cited

U.S. PATENT DOCUMENTS

| | | | |
|---|---|---|---|
| 2006/0253704 A1* | 11/2006 | Kempf et al. | 713/158 |
| 2008/0159222 A1* | 7/2008 | Akram et al. | 370/331 |
| 2008/0273461 A1* | 11/2008 | Liang et al. | 370/235 |

OTHER PUBLICATIONS

Aura, T. Cryptographically Generated Addresses (CGA). Network Working Group, Request for Comments: 3972. Mar. 2005.

* cited by examiner

PACKET REDIRECTION IN A COMMUNICATION NETWORK

FIELD OF THE INVENTION

The present invention relates to a method of controlling packet re-direction in a communication network. The method is particularly applicable to controlling re-direction of packets destined for a host that has two or more addresses, for example an address according to a first address realm and another address according to a second address realm.

BACKGROUND OF THE INVENTION

Most Internet applications either suffer or have suffered from problems relating to Internet Protocol (IP) address realm transitions. Such problems are particularly prevalent since the format of IP addresses is currently changing with the introduction of IP version 6 (IPv6) address realm to replace the IP version 4 (IPv4) address realm (as the number of addresses available under the IPv4 realm is no longer sufficient to meet demand). Examples of these problems include the inability to place servers behind Network Address Translators (NATs), difficulty in communicating from the IPv4 Internet to the IPv6 Internet and vice versa, limitations in multimedia applications that do not employ global addresses, and so on. A Name Address Translator, as an example, translates between an internal IP address of a device and the global IP address of the device—where the internal IP address is allotted to a device by local network, which may not want the internal address to be sent outside the network's firewall.

A number of solutions have been devised to deal with these problems. For instance, many applications and protocols have built-in "NAT traversal" mechanisms and a plethora of IPv4-to-IPv6 transition mechanisms exists. These solutions have, however, created a number of problems of their own.

One problem is that the inherent ambiguity of local address space leads to trial-and-error approach to finding a working path to a peer. A peer found through a server might be in the local network, or might be in a different local address space somewhere else. Moreover, the security of this approach relies entirely on probing and is susceptible to attackers on the path. For instance, an attacker in a local network would be capable of hijacking communications intended to someone else, even if the SIP server exchange that delivered the peer's address were performed securely.

Another problem is that configuration is needed in many of the solutions, and hence it becomes impossible for new devices to work "out of the box" in an automatic fashion. For instance, the Microsoft® Teredo IPv4-IPv6 transition service requires the configuration of the server's address, and typically requires the configuration of a shared key between hosts and servers.

In a communications network, a particular device may be identified by two or more addresses. The addresses may belong to different address realms from one another, or may belong to the same realm. In the communication network shown in FIG. 1, a host 1 in a first network (network 1) is communicating with a peer host 2 in another network (network 2) over, for example, an IP backbone 3. If host 1 has two different IP addresses, such as an IPv4 address and an IPv6 address, packets sent from host 2 to host 1 may identify host 1 as the destination by either the IPv4 address of host 1 or the IPv6 address of host 1. The choice of which address to use may for example depend on network availability or on other requirements—for example, some Internet technology is fundamentally limited to using IPv6 addresses. Thus, if host 2 is directing packets to the IPv6 address of host 1, host 1 might wish at some stage to instruct host 2 to switch to use the IPv4 address for host 1, or vice versa.

Assume that packets are being sent from a device in network 2, for example device 21, to host 1 of network 1, for example, in response to a request made by device in network 1. If the original request specified that the IPv6 address of host 1 should be used, the packets arriving at host 2 from device 21 will specify, as their destination address, the IPv6 address of host 1. If host 1 wishes to switch to using its IPv4 addresses, host 1 would send a re-direction message to host 2; the re-direction message would contain the IPv4 address for host 1, and would instruct host 2 to re-direct packets destined for host 1 to this IPv4 address rather than to the IPv6 destination address specified in the packet. Host 2 would then re-direct packets intended for host 1 to the IPv4 address of host 1 rather than to the IPv6 address.

One problem is that host 2 needs to be able to authenticate a received message that instructs it to re-direct packets to a new address. A malicious host, shown as host 4 in FIG. 1, could wish to intercept the packets passing from host 2 to host 1. The malicious host might therefore send a message to host 2 that contains an IP address for host 4, or for a device controlled by host 4, and instruct host 2 to re-direct packets destined to host 1 to this new address rather than to the IPv6 address for host 1 specified in the packets. If host 2 were to obey this instruction, host 2 would re-direct packets to the malicious host 4 rather than to the intended host 1. It is therefore important that host 2 should be able to distinguish between a genuine re-direction message sent by host 1 and a malicious re-direction message sent by host 4.

An IPv6 address typically has the form of a prefix and a suffix. The prefix of the address is a "routing prefix" and is allotted to, for example, a host such as the host 1 in FIG. 1. The suffix is an "interface identifier", and identifies a particular device. Whenever a device in the network controlled by the host 1, such as device 11 in FIG. 1, wishes to connect to the Internet, an IPv6 address is generated for that device by choosing a suffix and combining the suffix with the routing prefix allotted to host 1. It is then necessary to check that the generated IPv6 address is not already in use by another device in the network, ie to check that the particular interface identifier suffix chosen for device 11 is not already in use by another device in the network 1. This done by broadcasting a message that includes the IPv6 address generated for device 11 and asking other devices in the network, such as the devices 12,13 in FIG. 1, to indicate if they are already using the address. This process is, however, also vulnerable to attack by a malicious party. For example, if malicious host 4 were to read the broadcast message including the IPv6 address generated for device 11 and respond by claiming that the particular IPv6 address chosen for device 11 was already in use, the device 11 would not be allotted that IPv6 address. It would be necessary to generate another IPv6 address for device 11, and to broadcast a message including that address to check whether it was in use. If the malicious host 4 were to respond to every such broadcast message by claiming that the IPv6 address included in the message was already in use, the malicious host 4 would be able to prevent an IPv6 address being allotted to device 11.

SUMMARY OF THE INVENTION

A first aspect of the present invention provides a method of controlling the re-direction of IP packets to an IP host having two or more different IP addresses, the method comprising the steps of:

generating a first of said IP addresses as a one-way function of the second IP address; and at a peer host or network routing node, accepting a request to re-route a packet destined to said first IP address to another IP address only if the other IP address is the second IP address.

A "one-way function" is a function such that, for a given object and a given one-way function, it is straightforward to calculate the result of applying the one-way function to the object—but, for a given result, it is very difficult to determine the original object to which the one-way function was applied to obtain the known result, even if the one-way function is known. "One-way" functions of this type are well-known. A cryptographic hash function is one example of a "one way" function.

In the method of the invention, therefore, the peer host or routing node can easily tell whether the re-direction request is genuine, provided that they know the one-way function used to generate the first IP address from the second IP address. They simply need to apply the one-way function to the IP address contained in the re-direction request and see whether the result is the first IP address: if the result of applying the one-way function is the first IP address, then the request may be taken to be genuine—but if the result is not the first IP address then the re-direction request should be regarded as malicious.

In a preferred embodiment of the invention, the method further comprises including the first IP address in a packet destined for the second IP address, and, at a peer host or network routing node, accepting a request to re-route a packet destined to said second IP address to another IP address only if the other IP address is the first IP address included in the packet.

Generating the first IP address as a one-way function of the second IP address solves the problem of authenticating a request to re-direct a packet destined to the first IP address. However, it does not solve the problem of authenticating a request to re-direct a packet destined for the second IP address. The second IP address is not an output of the one-way function, and a malicious user could generate a spurious re-direction address that they control, but that is different to the first IP address. However, by including the first IP address within a packet destined to the second IP address, it is then possible to prevent packets being wrongly re-directed to a malicious user. When a request is received to re-direct a packet destined to the first IP address to another IP address, it can easily be checked whether the other IP address contained in the re-direction request is the same as the first IP address included in the packet. If the other IP address contained in the re-direction request is the same as the first IP address included in the packet then the packet is re-directed to that address, otherwise the re-direction request is ignored.

The first IP address may be encapsulated within the packet, for example as an inner packet.

A second aspect of the invention provides a method of controlling the re-direction of IP packets to an IP host having two or more different IP addresses, the method comprising the steps of: generating a first of said IP addresses as a one-way function of the second IP address; and transmitting the one-way function to a peer host or to a network routing node.

This method includes the steps that would be carried out at the host at which the first IP address is generated.

A third aspect of the invention provides a method of controlling the re-direction of IP packets to an IP host having two or more different IP addresses, the method comprising the steps of: receiving, at the peer host or network routing node, a request to re-route a packet destined to a first IP address to another IP address; applying a one-way function to the another IP address; and accepting the re-routing request only if the result of applying the one-way function to the another IP address is the first IP address.

This method includes the steps that would be carried out at the peer host or routing node. The one-way function applied is, of course, the same one-way function as used to generate the first IP address from the second IP address.

A fourth aspect of the invention provides a storage medium containing a program for controlling a processor to carry out a method of the first, second or third aspect.

Other aspects of the invention provide a communications network corresponding to the first aspect of the invention and apparatus corresponding to the second or third aspects of the invention.

BRIEF DESCRIPTION OF THE DRAWINGS

Preferred embodiments of the present invention will now be described by way of illustrative example with reference to the accompanying figures in which.

DETAILED DESCRIPTION OF THE PREFERRED EMBODIMENTS

Figure 1:
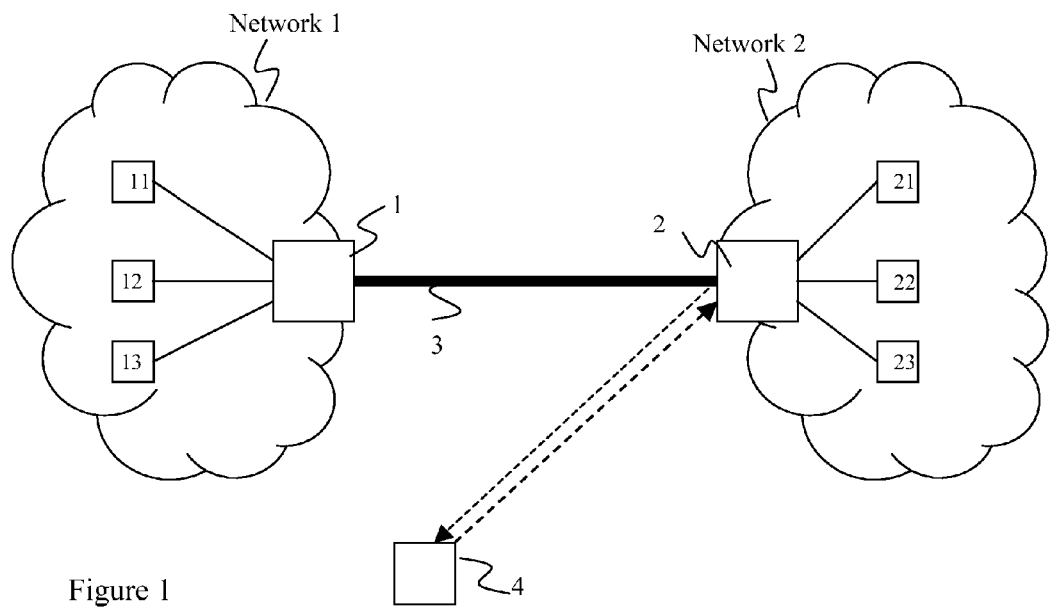
FIG. 1 is a schematic illustration of a communication network.
Figure 2:
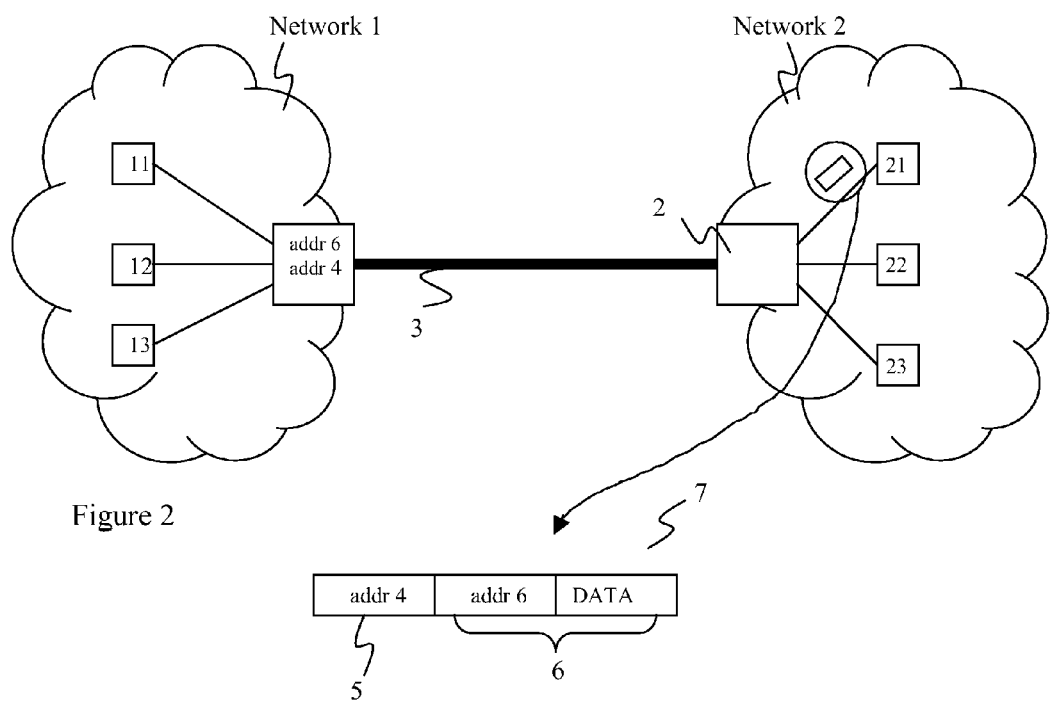
FIG. 2 is a schematic illustration of a communication network employing the method of the invention.

FIG. 2 is a schematic illustration of a communications network employing the method of the present invention. The network corresponds to the network shown in FIG. 1, and contains a host 1 in a first network (network 1) that is communicating with a peer host 2 in another network (network 2) over, for example, an IP backbone 3. Network 1 contains devices controlled by the host 1, and these are represented as devices 11,12, 13 in FIG. 1, and Network 2 contains devices controlled by the host 2, and these are represented as devices 21,22, 23 in FIG. 1. Host 1, and the devices 11,12,13 in network 1 each have two or more IP addresses. In the foregoing description it will assumed that host 1 and the devices 11,12,13 in network 1 each have exactly two IP addresses, a first IP address and a second IP address, but the invention is not limited to this. It will also be assumed that the first IP address is an IPv6 address ("addr6") and that the second IP address is an IPv4 address ("addr4"), but the invention is again not limited to this.

According to the present invention, the first IP address and the second IP address are bound to one another by a one-way function. It will be assumed, as an example, that the one-way function is a cryptographically secure hash function (or "cryptographic hash function"). That is, the first IP address ($IPad_1$) is determined from the second IP address ($IPad_2$) according to the general relation: $IPad_1=hash(IPad_2)$. However, the one-way function is not limited to a cryptographic hash function and any cryptographically secure one-way function may be used.

The function hash( ) is defined in such a way that it is very difficult to reverse the operation, i.e. obtain the value that the function has operated upon. The function hash( ) can be public knowledge; its one-way functionality means that it does not need to be secret.

One form of an IPv6 address is a Hash-Based Address (HBA). HBAs are known, for example from [draft-ietf-shim6-hba] Marcelo Bagnulo. "Hash Based Addresses". Internet Draft draft-ietf-shim6-hba-01.txt. Work In Progress, IETF, 2005. Simplifying a little, HBA forms a set of addresses bound to each other in a cryptographic manner:

$$addr1 = prefix1 | hash(modifier | prefix1 \ldots prefixn)$$

$$\ldots$$

$$addrn = prefixn | hash(modifier | prefix1 \ldots prefixn) \quad (1)$$

These address have the form stated above, with the "prefix1" being the routing prefix of the address and the "hash (modifier|prefix1 . . . prefixn)" being the interface identifier suffix. The "prefix1" . . . "prefixn" terms in the hash term are the routing prefixes of the addresses. The modifier is provided in the hash term, as is known, to increase security by varying the term on which the hash function operates. The modifier may be, for example, a random number.

Addresses within this set are interchangeable and attackers cannot force other addresses to be used.

Another form of IPv6 address is a Cryptographically Generated Address (CGA). CGAs are described by Tuomas Aura in "Cryptographically Generated Addresses". RFC 3972, IETF, March 2005. A CGA can be used to form an address from a public key generated in the node, and has the following form:

$$Addr = prefix | hash(public\ key | modifier) \quad (2)$$

These addresses have the form stated above, with the "prefix" being the routing prefix of the address and the "hash (public key|modifier)" being the interface identifier suffix.

A signature of the associated private key can secure any operation on this address.

However, a current limitation of these HBA or CGA IPv6 addresses is the lack of ability to employ them with IPv4 addresses. The invention broadens the application of cryptographically generated addresses.

Assume that packets are being sent from a device in network 2, for example device 21, to a host 1 of network 1, for example in response to a request made by a device in network 1. If the original request specified the first IP address of host 1 as the destination address for the packets, the packets arriving at host 2 from device 21 will specify, as their destination address, the first IP address of host 1 (namely the address "addr6" in the example where the first IP address is an IPv6 address).

If host 1 wishes to switch to using the second IP address (namely to the address "addr4" in the example where the second IP address is an IPv4 address), it sends a re-redirection request to the host 2 of the second network, specifying that packets destined for the first IP address addr6 should be re-directed to another IP address, namely to the second IP address addr4. As explained above, the first IP address addr6 was generated by applying a one-way function to the second IP address addr4.

When the host 2 of the second network receives a re-direction request which specifies that packets destined for the first IP address addr6 should be re-directed to another IP address, the host 2 determines whether the another IP address in the re-direction request is the same as the second IP address. If it is the same, the host 2 determines that the re-direction request has come from the first host and so re-directs packets in accordance with the request (so that packets arriving at the host 2 of the second network that are destined for the first IP address addr6 are re-directed to the second IP address addr4). If, however, the host 2 of the second network determines that the another IP address in the re-direction request is not the same as the second IP address, it determines that the re-direction request has not come from the first host and so ignores the re-direction request.

In order to check whether the another IP address contained in the re-direction request is the second IP address of the host 1 of the first network, the host 2 of the second network employs the hash function (or other one-way function) used to generate the first IP address addr6 of the host 1 from the second IP address addr4 of the host 1; the host 2 of the second network is aware of the hash function since the host 1 of the first network may have transmitted the hash function direct to the host 2 of the second network, or the host 1 of the first network may have made the hash function public knowledge. If the another IP address in the re-direction request is the second IP address addr4 of the host 1, the result of applying the hash function to the IP address specified in the re-direction request will be the first IP address addr6 of the host 1 (which is of course known to the host 2). However, if the another IP address in the re-direction request is not the second IP address addr4 of the host 1, but is a fake address addr4', the result of applying the hash function will not be the first IP address addr6 of the host 1. Thus, if the result of applying the hash function to the other IP address contained in the re-direction request is the first IP address addr6 of the host, this shows that the redirection request has indeed come from the first host. The host 2 of the second network is thus able to determine whether the re-direction request that it has received is genuine (ie, is from the host 1 of the first network). The second host ignores any re-direction request that it determines was not made by the first host.

In their simplest form, an IPv4 address ("addr4") and an IPv6 address ("addr6") can be bound to each other in the following form, which is similar to equation (1) above:

$$addr6 = prefix | hash(modifier | prefix | addr4) \quad (3)$$

As stated above, an IPv6 address consists generally of a prefix part and an interface identifier suffix. In equation (3), the interface identifier suffix of the IPv6 address is generated by a hash function on the IPv4 address. The "prefix" in the hash term is the routing prefix of the IPv6 address. The modifier is provided, as is known, to increase security by varying the term on which the hash function operates. The modifier may be, for example, a random number.

When the first address (in this example an IPv6 address) has been constructed in this manner, a multiaddressing protocol can be constructed as explained above so that it is not possible to redirect a packet destined to the first address (addr6) to any other address except the second address (addr4) used to generate the first address, because addr4 is the only address which can be input to the hash to obtain addr6 as the output.

However, forming the first IP address by a hash function on the second IP address does not solve the problem of authenticating a request to re-direct packets that are destined for the second IP address, since the second IP address (addr4 in this example) is not an output from equation (3). An attacker can take any IPv4 address and any IPv6 prefix and construct a fake IPv6 address (addr6') that the attacker controls but which is different from the true IPv6 address (addr6) of the host 1.

In a preferred embodiment of the invention, therefore, an additional requirement is placed on the multiaddressing protocol. This requirement is that redirection of packets destined to the second IP address (cg addr4) of the host 1 can only take place for a limited subset of traffic to and from the second IP address of the host. Specifically, only traffic that employs packets directed to or from the first IP address (addr6) of the host may be re-directed in this embodiment.

It is expected that in future, most if not all communications will employ IPv6 addresses, even if a communication is sent via nodes that are only connected through an IPv4 network. In this embodiment, even though an IPv4 address is used for communications, a packet will contain the IPv6 address of the destination. Thus, a packet 7 has an outer packet 5 with the second IP address (in this example an IPv4 address) and an inner, encapsulated packet 6 containing the first IP address (in this example an IPv6 address) and packet data fields. If a re-direction request is received at host 2 of the second network asking that packets destined to the IPv4 address addr4 of the host 1 are re-directed to an IPv6 address, the node 2 of the second network compares the IPv6 address in the re-direction request with the IPv6 address addr6 in the inner packet 6. If the IPv6 address in the re-direction request is the same as the IPv6 address in the inner packet 6, the packet 7 is re-directed from the IPv4 address in the outer packet 5 to the IPv6 address in the inner packet 6. If, however, the IPv6 address in the re-direction request is not the same as the IPv6 address in the inner packet 6, the host 2 ignores the re-direction request. Thus, in this embodiment, a request to redirect packets from the first IP address to the second IP address and a request to redirect packets from the second IP address to the first IP address can both be authenticated. The provision of the first IP address in the inner packet means that it is no longer possible for an attacker to redirect packets originating in the second network 2 and destined to the second IP address of host 1 to an IP address controlled by the attacker. Only packets that are destined for the IP address controlled by the attacker can be re-directed to the IP address controlled by the attacker.

The provision of the first IP address in the inner packet also makes it possible for TCP sessions to survive address changes; TCP requires the same IP addresses to be used.

The invention is not limited to including the first IP address in a packet by encapsulating the first IP address in an inner packet in the manner described above. The first IP address may be included in the packet 7 in any suitable manner.

This basic scheme with two addresses can be extended in various ways. In the following we discuss these extensions.

For NAT traversal, the owner of the first IP address (addr6) can employ both internal and external IP addresses as well as port numbers for UDP encapsulation. This makes it possible to securely bind the "real" IPv6 addresses used for the actual payload packets and the internal and external addresses. This overcomes one of the problems of Teredo, the need to rely on probing to determine address equivalence.

In the embodiment described above the IPv6 address and the IPv4 address are linked by equation (3), so that the IPv6 address is generally of an HBA form. For dynamic environments, CGA instead of HBA can be employed, so that the IPv6 address (or, in general terms, the first IP address) is generally of a CGA form. This allows multiple IPv6 addresses to be created and secured through signatures rather than the static HBA relationship. Similarly, IPv4 addresses can either appear as static input to the hash or in a signed statement from the address owner.

Generalizing, we can define Cryptographically Generated General Addresses (CGGAs) as follows:

A CGGA is an address set that satisfies equation (4):

$$addr6\_1 = prefix1 | hash(material | prefix1 \ldots prefixn | id1 \ldots idn)$$

$$\ldots$$

$$addr6\_n = prefixn | hash(material | prefix1 \ldots prefixn | id1 \ldots idn) \qquad (4)$$

In equation (4), addr6_1 addr6_n are the core set of IPv6 addresses (or, more generally the core set of first IP addresses), prefix1 prefixn are the set of prefixes in that set, and material represents public keys (possibly several), random modifiers and other parameters. id1 . . . idn are the other identifiers bound to the core set. Examples of other identifiers include, for example, global and local IPv4 addresses, fixed IPv6 addresses that the creator of the set is unable to change (e.g. due to allocation from DHCPv6), or address and port number of a NAT device. Thus, in the example of FIG. 2, the IPv6 address of the host 1, would be generated by an equation of the form of equation (4) with the IPv4 address of the host 1 (addr4) used as one of the id1 . . . idn terms in the hash.

CGGAs provide assurances of address ownership, membership, and relationship. These assurances come in several variants:

a) Given the input parameters, anyone can verify that the core set is correct. This can be used in multiaddressing operations that switch communications within the core set.

b) Given the other identity parameters, anyone can verify that the core set is related to the other identities. This can be used in multiaddressing operations that switch communications from the core set to the other identifiers or switch communications from the core set to the other identifiers and the core set (e.g. UDP NAT traversal via a specific NAT device, carrying IPv6 traffic inside).

Similarly, communications may employ both a core set identifier and another identifier, such as when IPv6 packets are encapsulated inside IPv4 packets. Such communications can be switched from the other identifier back to using solely a core set identifier.

c) Given one or more signatures from the private keys associated with the input public keys, the private key holders can show that they are owners (or one of them) of the core set. This can be used in multiaddressing operations that move communications from the core set to previously unknown addresses.

The method of the invention has been described above as being performed in an IP host 2. The invention may alternatively be performed in a network routing node.

The method of the present invention may be implemented by a suitably programmed processor. A program for controlling a processor to perform the method of the invention may be stored on any suitable storage medium such as, for example, a computer disk, a magnetic disk or an optical disk.

The invention claimed is:

1. A method in a communication network of controlling the re-direction of IP packets to an IP host having two or more different IP addresses, the method comprising the steps of:

generating a first of said IP addresses, the first of said IP addresses being generated as a one-way function of a routing prefix and a second IP address, and the one-way function being a cryptographic hash function; and at a peer host or network routing node, accepting a request to re-direct a packet, destined to said first IP address, to another IP address only if the other IP address is the second IP address.

2. The method as claimed in claim 1 further comprising the step of, at the peer host or network routing node, applying the one-way function to the another address contained in the re-direction request.

3. The method as claimed in claim 1 and further comprising the steps of including the first IP address in a packet destined for the second IP address, and, at a peer host or network routing node, accepting a request to re-route a packet destined to said second IP address to another IP address only if the other IP address is the first IP address included in the packet.

4. The method as claimed in claim 1, wherein the first address is an IPv6 address.

5. The method as claimed in claim 1, wherein the second address is an IPv4 address.

6. The method as claimed in claim 1 wherein the step of generating the first of said IP addresses comprises generating the first of said IP addresses according to:

addr6=prefix|hash(modifier|prefix|addr4)

where addr6 is an IPv6 address and addr4 is an IPv4 address.

7. The method as claimed in claim 1, wherein the step of generating the first of said IP addresses comprises generating the first of said IP addresses ($Ipad_1$) according to:

$Ipad_1$=prefix 1|hash(material|prefix 1 . . . prefix$n$|id1 . . . id$n$), where one of id1 . . . id$n$ is the second address.

8. A method in a communication network of controlling the re-direction of IP packets to an IP host having two or more different IP addresses, the method comprising the steps of:
generating a first of said IP addresses as a one-way function of a second IP address; and
transmitting the one-way function to a peer host or to a network routing node.

9. A method in a communication network of controlling the re-direction of IP packets to an IP host having two or more different IP addresses, the method comprising the steps of:
receiving, at the peer host or network routing node, a request to re-route a packet destined to a first IP address to another IP address;
applying a one-way function to a routing prefix and the another IP address, the one-way function being a cryptographic hash function; and
accepting the re-routing request only if the result of applying the one-way function to the another IP address is the first IP address.

10. A communication network comprising:
an IP host having two or more different IP addresses, a first of said IP addresses having been generated as a one-way function of a routing prefix and a second IP address, the one-way function being a cryptographic hash function; and
receiver means for accepting, at a peer host or network routing node, a request to redirect a packet destined to said first IP address to another IP address only if the other IP address is the second IP address.

11. An apparatus for controlling the re-direction of IP packets to an IP host having two or more different IP addresses, the apparatus comprising:
a network routing node for receiving a request to re-route a packet destined to a first IP address to another IP address;
a processor and memory containing instructions that, when executed by the processor, cause the processor to apply a one-way function to a routing prefix and the another IP address, the one-way function being a cryptographic hash function; and
a receiver for accepting the re-routing request only if the result of applying the one-way function to the another IP address is the first IP address.

12. The apparatus as claimed in claim 11, wherein the network routing node is further configured to receive
a request to re-route a packet destined to said second IP address to another IP address; and
wherein the instructions, when executed by the processor, further cause the processor to determine whether the another IP address is included in the packet.

* * * * *